3,285,978
PROCESS FOR PRODUCING 1,3-DICHLORO-OLEFINS
Taijiro Oga, Tokyo, Michitoshi Kitabatake, Kawasaki-shi, Kanagawa-ken, and Masao Ogawa and Masazumi Kusunoki, Yokohama, Japan, assignors to Showa Denko Kabushiki Kaisha, Tokyo, Japan, a corporation of Japan
No Drawing. Filed Oct. 7, 1963, Ser. No. 314,530
Claims priority, application Japan, Oct. 11, 1962, 37/43,782, 37/43,783; Aug. 9, 1963, 38/40,849, 38/40,850, 38/40,851
7 Claims. (Cl. 260—654)

The present invention relates to a new process for producing 1,3-dichloroolefins, and more particularly, this invention relates to the process for producing, from monochloroolefins having 3 or 4 carbon atoms, the corresponding 1,3-dichloroolefins respectively.

More specifically, the present invention relates to the process for producing 1,3-dichloropropene from 3-chloropropene (allylchloride), and 1,3-dichlorobutene-2 from 3-chlorobutene-1 (α-methyl allylchloride) by employing alkylhypochlorites as the chlorinating agent, and the present invention also relates to a process for pretreating the 3-chloropropene and 3-chlorobutene-1 used in the reaction with said alkylhypochlorites in order to impart special reaction activities thereto.

The inventors of this invention have found that 1,3-dichloropropene and 1,3-dichlorobutene-2 are selectively obtained when raw 3-chloropropene and 3-chlorobutene-1 are chlorinated respectively by alkylhypochlorites.

Hitherto, 1,3-dichloropropene has been obtained as a by-product when allyl chloride is produced by chlorinating propylene, or by applying thermal-chlorination to allylchloride and, the product thus obtained is now being used, for example, as the principal ingredient of an insecticide.

When obtaining 1,3-dichloropropene through thermal-chlorination of allylchloride, an apparatus is required which will withstand the attack of chlorine at high temperature. This process suffers from an added disadvantage in that it is impossible to avoid unfavourable side reactions such as thermal cracking of allylchloride, and the addition of chlorine to allylchloride. For these stated reasons, the thermal-chlorination of allylchloride has been commercially unsatisfactory.

1,3-dichlorobutene-2 has been obtained as a by-product formed during the production of chloroprene by the addition of hydrochloric acid to vinyl-acetylene. 1.3-dichlorobutene-2 is now being used in agricultural chemicals.

The main reason why the production and utilization of 1,3-dichlorobutene-2 has not hitherto been widely used is that a commercially feasible method for its industrial production has not been discovered.

If 1,3-dichlorobutene-2 could be produced effectively by any other means, it would be profitable to utilize 1,3-dichlorobutene-2 as a raw material of chloroprene, or as intermediate in organic synthesis.

With these deficiencies in mind the inventors of the present invention started to find a process for the effective production of 1,3-dichloropropene and 1,3-dichlorobutene-2 from 3-chloropropene and 3-chlorobutene-1 respectively under suitable reaction conditions.

In the early stage of our research, we tried a process wherein molecular chlorine was used as the chlorinating agent, however in this case chlorine addition to the double bond occurred both in the vapor phase-reaction and in the liquid phase-reaction. Of course a proper solvent was utilized in the liquid phase reactants. As a result the corresponding trichloroalkane is the primary product.

Also in a liquid phase reaction wherein sulfuryl chloride was used in the presence of known radical initiators which serve to generate a chlorine radical, it was impossible to obtain the desired 1,3-dichloroolefin.

It is a known fact that 1,3-dichloropropene is obtained by the thermal-chlorination to 3-chloropropene, but in this case, thermal cracking, and other secondary reactions unavoidably occur at the same time. As a result of the high temperature used in thermal chlorination processes presently known these disadvantages are to be expected.

Furthermore, 1,3-dichlorobutene-2 is obtained as one of the products after the thermal-chlorination of 3-chlorobutene-1, but various isomers are produced simultaneously as a result of the thermal cracking of 3-chlorobutene-1, and such a method is far from what is called an economical process.

Furthermore, it is reported that even N-bromosuccino imide which is regarded as a representative halogenating agent of allyl group can not produce the corresponding 1,3-dihalopropene and 1,3-dihalobutene from allylchloride and methylchloride. (Ref. J. Am. Chem. Soc. 79, 753 (1957).)

Now, applicants have discovered a process which enables them to selectively produce 1,3-dichloropropene and 1,3-dichlorobutene-1 by treating 3-chloropropene and 3-chlorobutene-1, in the presence of some radical initiators, with alkylhypochlorite.

To our surprise, in this reaction the desired 1,3-dichloroolefin is selectively obtained without accompanying 3,3-dichloroolefin-1 or 3,4-dichloroolefin-1, which have been unavoidably produced by all known processes.

When butene-1 is chlorinated by alkylhypochlorite, a large amount of 3-chlorobutene-1 forms inevitably as a by-product with 1-chlorobutene-2.

We have also found that after 3-chloropropene and 3-chlorobutene-1, or 1-chlorobutene-2 are obtained through a specially devised distillation for carrying out the isomerization, the thus treated chloroolefins may be effectively utilized as the raw materials thus enabling a smooth reaction as described above without adding any radical initiators.

Therefore, one of the purposes of this invention is to provide a process for the selective production of 1,3-dichloropropene from 3-chloropropene.

Another purpose of this invention is to provide a process for the selective production of 1,3-dichlorobutene-2 from 3-chlorobutene-1.

Another purpose is to provide a process for the selective production of 1,3-dichlorobutene-2 from 1-chlorobutene-2, and also another purpose of this invention is to provide a process for the production of 1,3-dichlorobutene-2 which is regarded as one of the useful steps in the new method for production of chloroprene.

Other purposes and advantages of this invention are disclosed in detail in the following description.

Generally speaking, the process of this invention comprises reacting 3-chloroolefins having 3 or 4 carbon atoms with an alkylhypochlorite, selectively producing and distilling out the corresponding 1,3-dichloroolefins. This is a substitutional chlorination, and is represented by the reaction formula:

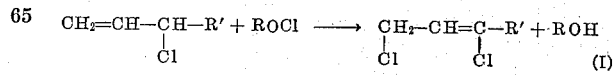

(wherein R' stands for H or CH$_3$).

Thus, 1,3-dichloropropene can be produced selectively from 3-chloropropene (in case R' is H). In the same way, 1,3-dichlorobutene-2 can be produced selectively from 3-chlorobutene-1 (in case R' is CH₃).

The thus obtained products represent a mixture of the cis- and trans-isomers.

In the foregoing formula, ROCl means alkylhypochlorite, and R stands for an alkyl group.

Examples of such alkyl groups are the straight or branched chained substituents such as ethyl-, propyl-, butyl-, amyl-, hexyl-, heptyl-groups, and a preferred group is a tertiary alkyl group.

Examples of the tertiary alkylhypochlorite are t-butylhypochlorite, t-amylhypochlorite, n-propyldimethylcarbinylhypochlorite [n-C₃H₇(CH₃)₂COCl], n-butyldimethylcarbinylhypochlorite [n-C₄H₉(CH₃)₂COCl], and the like.

In the foregoing Formula I ROH, the by-product, means alcohol corresponding to the aforesaid alkylhypochlorite.

We found that the chlorinating reaction represented by the foregoing Formula I is remarkably accelerated by the addition of a radical initiator.

The radical initiators here mean those used in known radical reactions, for example, azonitriles like azobisisobutyronitrile, and peroxides like benzoyl peroxide, and hydroperoxides like t-butyl hydroperoxide, cumene hydroperoxide and lights including ultraviolet light.

In the process of this invention, these radical initiators can be used independently or concurrently with a good result obtainable in either case.

The amount of radical initiators is not critical, but is usually varied from 0.1 to 5% by weight based on alkylhypochlorite, and thus, a good result can be expected.

In order to irradiate lights including ultraviolet light, ordinary processes such as the irradiation from outside a glass reaction-vessel, or the irradiation with the source of lights fixed inside the reaction-vessel. We also found that other than commonly known radical initiators, iodine or tertiary amines, which cannot work as radical initiators by themselves, can effectively perform a favourable function for the reaction represented by Formula I by the present invention.

As the tertiary amines employed in the process of this invention, aliphatic or aromatic tertiary amines are especially effective and among the typical examples are triethylamine, methyldiethylamine, tri-n-butylamine, triethanolamine, α, β, or γ-picoline, pyridine, N,N-dimethylaniline, phenyl substituted N,N-dimethylaniline, N,N-dimethyltoluidine. The above illustrated iodine or tertiary amines do not function as radical initiators by themselves, but can make radicals after they have reacted with alkyl hypochlorite, and accordingly they are considered to accelerate the chlorination in this invention.

Iodine or tertiary amines can be dissolved in the reaction mixture solution. The amount to be added thereto is an amount less than 5% by weight based on alkylhypochlorite an excellent result may be obtained by using such an amount.

The more the amount added, the higher the reaction velocity will be, and therefore if the consumption of alkylhypochlorite caused by the reaction with these additives could be overlooked, excessive amount of additives may be added thereto.

There is no restriction on the method for adding these additives to the reactants.

For example, the said additives can be added to the mixture of 3-chlorobutene-1 and alkylhypochlorite. Also, the reacting components can be mixed with the other reacting component said additives having been previously added. Also, the supplementary part of the additives can be added during the reaction.

More than two different kind of additives can be mixed and added, or together with ordinary radical initiators such as azobisisobutyronitrile, benzoyl peroxide, and, hydroperoxide the said additives can be added so as to accelerate the said reaction.

We found, in this connection, by employing ultraviolet light irradiation in combination with the foregoing methods, the rate of reaction is further accelerated, and the time required for the reaction is cut short.

As one of the examples where ultraviolet ray-irradiation is employed, after the conversion of alkylhypochlorite has reached 70% in the chlorination carried out by adding iodine or tertiary amines, ultraviolet-light is irradiated thereto, and the reaction time thereafter is short, thus the conversion as a whole can be enhanced.

Of course the irradiation step can be combined at the start of the reaction.

We also found that the reaction shown in the foregoing formula is rather rapidly carried out in the absence of the aforesaid radical initiators such as iodine or tertiary amines, when specially pre-treated 3-chloroolefins are used as raw materials.

The pretreatment as mentioned above means that 3-chloropropene, or 3-chlorobutene-1, or 1-chlorobutene-2 are charged into a still of the distillation-tower in combination with the chlorides of the metals of IB, IIB, IVB, or VB groups of the Periodic Table, especially with cuprous chloride, zinc chloride, stannous chlorides, bismuth chloride, (a small quantity of hydrochloridic acid can be present). More preferably, the aforesaid chlorides of metals of IB, IIB, IVB, or VB groups of Periodic Table are mixed with the mixture or complex salt of amines having a higher boiling point than the raw material chloroolefins as α, β, or γ-picoline, monoethanolamine, diethanolamine, triethyanolamine, toluidine, primary-, secondary-, or tertiary-butylamine. After one pretreatment 3-chloropropene, or 3-chlorobutene-1 are distilled out from the top of the distillation-tower.

The substitutional chlorination of thus obtained pretreated 3-chloropropene, or 3-chlorobutene-1 is smoothly carried out in the absence of reaction initiators by alkylhypochlorite to obtain the corresponding 1,3-dichloroolefin.

It is known that allylic chlorides can follow the reversible reaction shown by Formula II below with the catalytic action of metallic chlorides such as cuprous chloride with or without a minute quantity of hydrochloric acid.

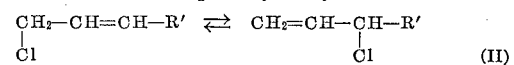

(wherein R' represents a hydrogen or alkyl group).

It is known, in this connection, that in case amines are concurrently present in the form of a mixture with metallic chlorides, or in the form of complex salts of amines and metallic chlorides, the reversible reaction shown in the foregoing Formula II is further accelerated, and unfavourable side-reactions such as polymerization of chloroolefins are inhibited.

In case R' is H, the compounds represented by the structural formula on both sides of equation of the Formula II are 3-chloropropenes (allyl chloride). But in case R' represents CH₃ 3-chlorobutene-1 (α-methyl allylchloride) on the right is heated with metallic chlorides or metallic chlorides-amines, a part of it is changed into 1-chlorobutene-2 (γ-methylallylchloride) on the left in accordance with Formula II.

However, by the distillation, 3-chlorobutene-1 having the lower boiling point is expelled out at the top of the tower, and thus separated from the mixture group. Therefore, according to the equilibrium relationship in Formula II, ultimately, almost all the products are recovered as 3-chlorobutene-1 at the tower-head.

Starting from 1-chlorobutene-2, in case the distillation thereof is carried out in the presence of metallic chlorides or metallic-chlorides-amines, all the 1-chlorobutene-2 supplied is transformed into 3-chlorobutene-1.

The thus obtained 3-chloropropene or 3-chlorobutene-1 can be supplied directly for the reaction with alkylhypochlorite for the chlorination to 1,3-dichloroolefins, and particularly, in the case of methyl allyl chlorides, γ-groups can be utilized simultaneously, and therefore, this is a very convenient method.

Next, the present invention is further explained by showing the following examples.

The distilled product obtained by heating 3-chloropropene 3-chlorobutene-1, or 1-chlorobutene-2 along with metallic chlorides, can react with alkylhypochlorite rather rapidly without a reaction-initiator in accordance with the reaction Formula I.

For example, 1% by weight of cuprous chloride, 1% by weight of concentrated hydrochloric acid based on 3-chlorobutene-1, and 3-chlorobutene-1 are mixed up in the still, and the mixture is distilled in a glass packed column having 30 mm. in diameter and 1,500 mm. in height by adopting the refluxing-ratio of 25/1, and the distillation-speed of 20 g./hr. to obtain pure 3-chlorobutene-1 at the top of the column.

When the thus obtained product is reacted with about ⅓ equivalent amount of t-butylhypochlorite in nitrogen atmosphere at 40° C., the conversion of t-butylhypochlorite reaches about 60% in one hour.

In the above example, in place of the combination of cuprous chloride-concentrated hydrochloric acid, 1% by weight of zinc chloride can be employed as well. When the thus obtained chlorolefine is reacted with t-butylhypochlorite under the exactly same condition, the conversion of t-butylhypochlorite is 43% in one hour. 3-chloropropene or 3-chlorobutene-1 treated by distilling it along with metallic chlorides and amines are more active in the reaction with alkylhypochlorite.

For example, the mixture of 0.5 weight percent cuprous chloride, 2.5 α-picoline based on 3-chlorobutene-1 and 3-chlorobutene-1 is charged in the aforesaid distillation tower. 3-chlorobutene-1 obtained under the aforesaid distilling conditions is then reacted with t-butylhypochlorite to give the conversion of t-butylhypochlorite after one hour at about 65%.

As aforementioned, the tertiary amines are effective reaction-initiators for reacting of 3-chloropropene, and 3-chlorobutene-1 with alkyl hypochlorite.

However, the existence of amines cannot be recognized even by infrared spectrum analysis in either 3-chloropropene or 3-chlorobutene-1 obtained by distilling it with the mixture of metallic chlorides and amines.

In order to insure the removal of amines from allylchloride and 3-chlorobutene-1 obtained by the above distillation, a complete treatment for removing amines is carried out, namely, the allylchloride and 3-chlorobutene-1 are washed with the dilute solution of an inorganic acid several times, and then rinsed with water. After the separation and the drying chlorination of thus treated chloroolefine is rapidly carried out without adding any reaction initiator when they are put in contact with alkylhypochlorite, and without any loss in reactivity between allylchloride and 3-chlorobutene-1 and alkylhypochlorite.

Thus, it is apparent that the effect of this process is not based on the result that amines remain in the distillate.

In carrying out the process of this invention, the quantities of the metallic chlorides and amines to be added in the distillation step, i.e., the pretreatment of the raw materials, varies in accordance with what kind of metallic chlorides and amines are used. However, in general, varied from 0.5 to 3% by weight and from 0 to 10% by weight respectively is deemed to be sufficient, but of course more than the above is allowable.

Conditions under which distillation is operated more or less affect the reactivity of the distillate.

When the refluxing-ratio is made greater and the distillation speed is slowed down, more active 3-chloropropene and 3-chlorobutene-1 for the chlorination reaction with alkylhypochlorite are obtainable, but in this case it is unavoidable that less raw materials can be treated.

Therefore, the refluxing-ratio, the distillation-speed and other distillation factors are to be determined by the efficiency of distilling apparatus as well as the reactivity of the distillate with alkylhypochlorite, and the quantity of distillate, etc. All these factors should be taken into consideration and are easily determined by one skilled in the art.

Thus obtained 3-chloropropene and 3-chlorobutene-1 after the distillation-treatment can be smoothly chlorinated by alkylhypochlorite without any reaction initiator, to give the corresponding 1,3-dichloroolefins.

In connection with this reaction, lights including ultraviolet light, azonitrile, peroxides, iodine, or one or more kind of tertiary amine can also be employed in the chlorination reaction, and in this case the speed of the reaction is further enhanced.

As one of the embodiments disclosed for using an initiator, can be applied in any stage of the reaction process, for example, when the conversion reaches a given extent, such a step as the irradiation of ultraviolet light is applied, and we found that such a step as mentioned above enhances the conversion of alkylhypochlorite and reduces the reaction-time.

The pretreating, wherein chloropropene and chlorobutene are distilled along with metallic chlorides or metallic chloride-amines, can be most effectively carried out by employing an appropriate distillation-column under atmospheric pressure, but it can also be carried out in a reduced or pressurized atmosphere or in the atmosphere of inert gas.

We have explained various modifications and conditions which accelerate the reaction between 3-chloroolefins and alkylhypochlorite by the process of the present invention, and the following are other factors of the reaction which can be desirably applied in carrying out the process.

As to the reaction temperature and pressure, there is no restriction, however, it is convenient to operate under the atmospheric pressure at the boiling point, or a little lower than that of the raw materials. (3-chloropropene having B.P. at 45° C. and 3-chlorobutene-1 having B.P. at 64.5° C.). Of course the reaction can be carried out either at lower temperature or at higher temperature under pressurized atmosphere.

When ultraviolet ray is irradiated, the reaction can be carried out at a temperature as low as the freezing point of the reactants.

If necessary, solvents that are inactive in this reaction such as carbon tetrachloride, carbon disulfide and the like can be employed in this reaction.

The necessary reaction time depends upon the various conditions under which the reaction is carried out, but in general the reaction takes about 0.5 to 5 hours.

The greater the feed ratio of 3-chloroolefins corresponding to the chlorinating agent, alkylhypochlorite, the higher the yield of the product, 1,3-dichloroolefins. In general, the feed ratio of 200 to 500 mol percent is preferably adopted.

The present reaction is inhibited by the oxygen in air as it is in an ordinary radical reaction, therefore it is preferred that the reaction is carried out in non-oxidizing atmosphere such as in the atmosphere of inert gases like nitrogen-gas.

Excesses of 3-chloropropene, and 3-chlorobutene-1, residual alcohols by-products produced according to Formula I can be easily separated from the aimed product by means of processes such as distillations and extractions.

The little amount of the by-products coming out in the reaction shown by Formula I are mostly those having a high boiling point produced by the addition of alkylhypochlorites to olefin double bonds, and separation from 1,3-dichloroolefins is easily effected.

By using the product produced herein, in a thermal cracking reaction, high yields of chloroprene were produced, thus confirming the above described process wherein 1,3-dichlorobutene-1 is selectively produced.

The following examples further illustrate this invention, however these examples do not restrict the scope of this invention.

EXAMPLE 1

The mixture of 120 g. 3-chlorobutene-1 and 30 g. t-butylhypochlorite, and 0.1 g. azobisisobutyronitrile as the initiator was refluxed at 65 to 70° C. for one and a half hours in the atmosphere of nitrogen-gas. The conversion of t-butylhypochlorite was about 100%.

The excess 3-chlorobutene-1 and t-butanol were distilled out under atmospheric pressure, and the latter was separated by extraction with water.

A little amount of acetone was also obtained as by-product. Thus 95.5 g. of 3-chlorobutene-1 was recovered.

The residue was distilled at 44 mm. Hg. The fraction of boiling point at 52–55° C. was 29 g.

We ascertained, in comparison with the gas chromatogram, and infrared spectrum of authentic samples, that this fraction was consisted of cis- and trans-1,3-dichlorobutene-2.

The ratio of cis- to trans-isomer was about 4:6 according to gas chromatogram.

The yield on t-butylhypochlorite was 84%, and the yield on 3-chlorobutene-1 was 85.6%.

The by-products of this reaction were mainly high boiling substances, produced by the addition of t-butylhypochlorite to the double bond of 3-chlorobutene-1.

EXAMPLE 2

100 g. of 3-chlorobutene-1 and 61 g. of t-amylhypochlorite are placed in a tube, and cooled to −40° C., and degassed and then irradiated with ultraviolet light in a water-bath at 20° C. for 40 minutes.

Distilling under atmospheric pressure, 58 g. of 3-chlorobutene-1 was recovered.

Then distillation of the residue of the foregoing distillation under the pressure of 40 mm. Hg was carried out to separate the produced t-amylalcohol and other by-products, and 39 g. of fraction having boiling point at 52–55° C. was obtained.

The yield of 1,3-dichlorobutene-2 on t-amylhypochlorite is 62.7%, and the yield on 3-chlorobutene-1 67.2%.

EXAMPLE 3

0.8 g. of iodine was added to the mixture of 120 g. of 3-chlorobutene-1 and 30 g. of t-butylhypochlorite, and the whole mixture was heated at 40° C. in nitrogen atmosphere.

The conversion of t-butylhypochlorite was 96%.

Excess 3-chlorobutene-1 and t-butanol were distilled out under the atmospheric pressure, and the latter was dissolved in the water, and separated.

93.7 g. of 3-chlorobutene-1 was recovered.

The residue was distilled under reduced pressure of 44 mm. Hg, 27.5 g. of fraction, boiling point 52 to 55° C., was obtained.

The gas chromatogram showed this fraction being 42% cis- and 58% trans-1,3-dichlorobutene.

The yield of 1,3-dichlorobutene-2 is 82.9% on t-butylhypochlorite, and 75.7% on 3-chlorobutene-1.

EXAMPLE 4

1 g. of purified α-picoline was added to 90 g. of 3-chlorobutene-1 and 42 g. of t-amylhypochlorite, and this mixture was refluxed in nitrogen atmosphere for three hours.

The conversion of t-amylhypochlorite was 92.6%.

After carrying out the same separation and purification as in Example 3, 26.2 g. of 97% 1,3-dichlorobutene-2 was obtained. The yield of 1,3-dichlorobutene based on the reacted t-amylhypochlorite was 64.1%.

EXAMPLE 5

120 g. of 3-chlorobutene-1, 35 g. of t-butylhypochlorite, and 0.7 g. of N,N-dimethylaniline were placed in a tube made of hard glass.

The glass tube was 20 cm. long, had the inner volume of 150 cc., and the thickness of glass wall was about 1 mm. The glass tube was degassed at −30° C. before reaction, and then sealed.

After keeping the sealed tube at 40° C. for one and a half hours, the concentration of t-butylhypochlorite was analyzed. Conversion of t-butylhypochlorite was about 65% at that time.

After cooling off the tube and again degassing it, 200 watt high pressure mercury lamp whose sparking part is about 15 cm. long is placed about 1 cm. away from the sealed tube at room temperature. Twenty minutes after turning on the mercury lamp, the yellow color of t-butylhypochlorite completely disappeared, and the reaction was brought to an end.

Purification of the reaction-products was carried out, and 32.0 g. of 1,3-dichlorobutene-2, fraction was obtained.

The yield on t-butylhypochlorite was 79.4%.

EXAMPLE 6

0.55 g. of triethylamine was added as the initiator to 90 g. of 3-chlorobutene-1 and 35 g. of t-butylhypochlorite, and the mixture was refluxed in nitrogen atmosphere, and in 5 hours the reaction was substantially brought to an end.

As the inner standard, a certain amount of dichloropropane as the standard material was added to the product, and this mixture was analyzed by gas chromatography. The yield of 1,3-dichlorobutene-2 was 77% on t-butylhypochlorite.

The ratio of the cis- and trans-isomers thereof was about 44:56.

EXAMPLE 7

0.1 g. of N,N-dimethyl-p-toluidine and 0.35 g. of benzoyl peroxide were added as initiator to the mixture of 100 g. of 3-chlorobutene-1 and 40 g. of t-butylhypochlorite, and the whole mixture was subjected to reaction at 45° C. for 5 hours in nitrogen atmosphere.

The conversion of t-butylhypochlorite reached about 100%.

36.5 g. of the fraction whose boiling point is 49 to 55° C. at 40 mm. Hg was obtained through reduced pressure distillation.

The yielding ratio of 1,3-dichlorobutene-2 on t-butylhypochlorite was 79.2%.

EXAMPLE 8

150 g. of commercial allyl chloride (3-chloropropene), and 472 g. of t-butylhypochlorite were placed in the tube. The tube was made of hard glass, had the inner volume of 300 cc., and the thickness of the glass was 1 mm. The tube was cooled to −40° C., degassed and sealed.

The tube was irradiated at 0° C. by 200 watt high pressure mercury arc lamp which was placed 5 cm. from the sealed tube.

After 1.5 hours the conversion of t-butylhypochlorite reached 100%.

The excessive 3-chloropropene and coming out t-butanol were distilled out, and the latter was dissolved in the water, and thus separated, and thus, 108 g. of 3-chloropropene was recovered.

By distilling the residue, 39.3 g. of fraction, boiling point 103 to 112° C., was obtained. Gas chromatogram showed that this fraction consisted of cis-1,3-dichloropropene, 49% trans-1,3-dichloropropene, and 1% 3,3-dichloropropene.

The yield of 1,3-dichloropropene on t-butylhypochlorite was 80.5% and majority of by-products in this reaction were high boiling point substance produced by the addition of t-butylhypochlorite to the double bond of 3-chloropropene.

EXAMPLE 9

As the reaction initiator, 0.1 g. of azobisisobutyronitrile was added to the mixture of 83 g. of allylchloride, and 44.3 g. of t-amylhypochlorite, and this whole mixture was subjected to the reaction at 40° C. for four hours in nitrogen atmosphere.

The conversion of t-amylhypochlorite was 71%. After separating low boiling point substances by distillation, and adding a certain quantity of dichloropropane as inner standard, and this mixture analyzed by gas chromatography. As a result, the ratio of cis-, and trans-1,3-dichloropropene, and 3,3-dichloropropene were 49:48:2.

The amount of 1,3-dichloropropene obtained was 176 g., and the yield on the reacted t-amylhypochlorite was 63.6%.

EXAMPLE 10

As the initiator, 0.5 gram of purified iodine was added to the mixture of 77 g. of allyl chloride and 30 g. of t-butylhypochlorite, and this mixture was subjected to the reaction at 40° C. for 35 hours in nitrogen atmosphere.

The conversion of t-butyl hypochlorite reached 97%.

As a result of the distillation thereof, 23.2 g. of 1,3-dichloropropene containing 1.5% 3,3-dichloropropene was obtained.

The yield of 1,3-dichloropropene corresponding to the reacted t-butylhypochlorite was 79%.

EXAMPLE 11

77 g. of allyl chloride and 30 g. of t-butylhypochlorite were put in a cylindrical glass vessel with a 120 watts high pressure-mercury-arc-lamp fixed up inside and with in- and out-let for nitrogen-gas.

After replacing the air inside the vessel with nitrogen, 0.8 g. of α-picoline was added as the initiator, and the said mixture was subjected to reaction at 40° C. without irradiation.

After 1.5 hours, a part of the solution was taken up and examined of the concentration of t-butylhypochlorite the conversion reached about 68%.

Then, the photochemical reaction by means of high pressure-mercury-lamp was conducted by means of high pressure-mercury-arc-lamp for 30 minutes, and then the yellow color of t-butylhypochlorite disappeared, and so the completion of the reaction was recognized.

By distillation, 28.8 g. of 1,3-dichloropropene containing 1.5% 3,3-dichloropropene was obtained. The yield on t-butylhypochlorite was 78.8%.

EXAMPLE 12

An initiator 0.5 g. of triethylamine was added to the mixture of 80 g. of allylchloride and 30 g. of t-butylhypochlorite, and this whole mixture refluxed for 4 hours in nitrogen atmosphere. The conversion of t-butylhypochlorite reached 98%.

As a result of purification and distillation 22.4 g. of 1,3-dichloropropene containing 1.3% acrolein dichloride was obtained. The yield of 1,3-dichloropropene corresponding to the reacted t-butylhypochlorite was 73.4%.

EXAMPLE 13

As the initiator 0.5 g. of benzoyl peroxide and 0.1 g. of N,N-dimethylaniline were added to the mixture of 150 g. of allyl chloride and 70 g. of t-butylhypochlorite and this whole mixture was subjected to the reaction at 40° C. for 3.5 hours in nitrogen atmosphere, the conversion of t-butylhypochlorite reached almost 100%, and 56.5 g. of fraction containing 51% cis- and 48% trans-1,3-dichloropropene was obtained.

The yield of 1,3-dichloropropene on t-butylhypochlorite was about 78%.

EXAMPLE 14

Metallic chloride (0.8 weight percent of allyl chloride), was added to commercial allyl chloride (3-chloropropene). When any amine was employed along with metallic chloride, amine (4 weight percent of allyl chloride) was heated together with metallic chloride to make them homogeneous. Then the said mixture was added to allyl chloride. Allyl chloride, containing metallic chloride or thus prepared metallic chloride-amine mixture, was supplied to the still of distillation column. Distillation column was 30 mm. in its diameter, 1500 mm. high, packed with glass Raschig rings, whose average diameter was 3 mm.

The distillation was carried out under atmospheric pressure.

The reflux ratio was 20/1, and the distillation speed of allyl chloride was about 30 g./hr.

The distilled allylchloride was subjected to the reaction with t-butylhypochlorite ⅓ equivalent of allylchloride at 40° C. in nitrogen atmosphere, and one hour later the reaction was cut off, and the conversion of t-butylhypochlorite was analyzed. The result of the analysis is given in Table I.

Experiment No. 11 is a comparable example where no additive was employed during distillation.

*Table I*

| Experiment Nos. | Additives Employed in distillation | Conversion of t-butylhypochlorite one hour after the start of reaction (percent) |
|---|---|---|
| 1 | Cuprous chloride-hydrochloride (1%). | 42.0 |
| 2 | Zinc chloride | 40.8 |
| 3 | Stannous chloride | 39.6 |
| 4 | Bismuth chloride | 41.7 |
| 5 | Bismuth chloride-α-picoline | 55.9 |
| 6 | Stannous chloride-β-picoline | 53.1 |
| 7 | Cuprous chloride-α-picoline | 56.2 |
| 8 | Cuprous chloride-triethanolamine | 48.7 |
| 9 | Cuprous chloride-t-butylamine | 44.5 |
| 10 | Zinc chloride-p-toluidine | 43.3 |
| 11 | None | 5.2 |

EXAMPLE 15

Cuprous chloride (0.8 weight percent of allyl chloride)-α-picoline (4 weight percent of allyl chloride) were added to commercial allyl chloride (3-chloropropene). This mixture was distilled under the same conditions as in Example 14. 44.3 g. of t-amylhypochlorite was added to 83 g. of 3-chloropropene thus obtained, and the mixture was subjected to the reaction at 43° C. for 2.5 hours in nitrogen atmosphere. And the conversion of t-amylhypochlorite was 73%.

0.3 g. of purified iodine was added thereto, and this mixture was refluxed for 2 hours, and the conversion of t-amylhypochlorite was almost 100%.

After distilling out low boiling substances, a certain amount of dichloropropane as the inner standard was added to the residue, which was analyzed by gaschromatography. As a result, the raio of cis- and trans-1,3-dichloropropene and 3,3-dichloropropene was about 50:49:1.

The yield of 1,3-dichloropropene was 26.9 g. (67.7% based on t-amylhypochlorite).

EXAMPLE 16

The mixture of 75% 1-chlorobutene-2, 25% 3-chlorobutene-1 was distilled under atmospheric pressure by 1,500 mm. high distillation-column packed up with glass-made-Raschig's rings whose average diameter were 30 mm.

When metallic chloride was employed as isomerizing catalyst, metallic chloride (0.8 weight percent of chlorobutenes) was added to the chlorobutenes.

When metallic chloride-amine mixture was employed, first, amine (4 weight percent of chlorobutenes) was heated, and after metallic chloride (10.8 weight percent of chlorobutenes) was dissolved in the amine, this hot mixture was put into the still where the chlorobutenes had been preheated.

When the reflux ratio was 20/1 the distillation speed of 3-chlorobutene-1 at the top of the column was 30 g./hr.

Thus obtained 3-chlorobutene-1 was subjected to the reaction with t-butylhypochlorite ⅓ equivalent of 3-chlorobutene-1 at 40° C. in nitrogen atmosphere.

After one hour the conversion of t-butyl-hypochlorite was analyzed, the result obtained is illustrated on Table II.

Experiment No. 8 is a comparable example where no additive was employed in distillation.

*Table II*

| Experiment Nos. | Additives employed in distillation | Conversion of t-butyl-hypochlorite (percent) |
|---|---|---|
| 1 | Cuprous chloride-hydrochloride (1%) | 52.7 |
| 2 | Zinc chloride | 50.3 |
| 3 | Bismuth chloride | 53.1 |
| 4 | Bismuth chloride-α-picoline | 64.1 |
| 5 | Cuprous chloride-α-picoline | 68.5 |
| 6 | Cuprous chloride-n-butylamine | 58.2 |
| 7 | Cuprous chloride-p-toluidine | 61.9 |
| 8 | None | 2.2 |

EXAMPLE 17

100 g. of 3-chlorobutene-1 (obtained through the distillation carried out with cuprous chloride-α-picoline as catalyst added thereto under the same conditions as in the foregoing Example 16), and 40 g. of t-butylhypochlorite were put into the cylindrical-glass vessel equipped with a 120 watts high pressure-mercury-arc-lamp and inlet and outlet for nitrogen-gas.

After replacing the inside of the vessel with nitrogen gas, the reaction was carried out at 40° C. for 2 hours without turning on the mercury lamp, and the conversion of t-butylhypochlorite was 72%. Then high pressure-mercury-arc-lamp was turned on and the reaction was continued, for 30 minutes more. The conversion of t-butylhypochlorite was 100%.

Distillation of the reaction mixture gave 37.5 g. of 1,3-dichlorobuten-2 (43% cis isomer, 57% trans isomer) B.P. 51–57° C./45 mm. Hg.

The yield of 1,3-dichlorobutene-2 on t-butylhypochlorite was 81.3%.

EXAMPLE 18

1 kg. of liquid butadiene was pressed into a 10 l. anti-corrosive pressure vessel, equipped with a stirrer. Adding thereto 55 kg. of 40% hydrochloric acid aq. solution and 130 g. of cupric chloride, the reaction was carried out for 8 hours. During the reaction the temperature went up to 50° C. at maximum. The produced monochlorobutene and aqueous layer were separated, and the hydrochloric acid and the catalyst were recovered out of the aqueous layer.

Unreacted excessive butadiene and the minute quantity of water in the monochlorobutene were distilled out under atmospheric pressure.

The yield of monochlorobutene was 1.4 kg., and the amount of the recovered butadiene was 0.15 kg. The conversion of butadiene was 85%. The yield of monochlorobutene against butadiene was 98.2%.

Thus obtained monochlorobutene was the mixture of 24% 3-chlorobutene-1 being, and 76% 1-chlorobutene-2 being.

Next, 1 kg. of monochlorobutene $C_4H_7Cl$ composed of thus obtained 3-chlorobutene-1 and 1-chlorobutene-2, 50 g. of α-picoline, and 10 g. of cuprous chloride were fed into the still, and subjected to the distillation at the distillation speed where the vapour temperature at the top of the column would not go beyond 65° C., by employing the 1,500 mm. high, 30 mm. wide glass distillation tower packed up with glass Raschig rings and equipped with a reflux condenser. Thus pure 3-chlorobutene-1 was distilled out.

813 g. of 3-chlorobutene-1 was obtained as a result of 15 hour distillation.

By distilling the residue 162 g. of 1-chlorobutene-2 was recovered. The yield of 3-chlorobutene-1 was 97%.

Next, 800 g. of 3-chlorobutene-1, 336 g. of t-butylhypochlorite, and 0.2 g. of azobisisobutylonitrile were placed in a 2 l.-glass flask equipped with reflux condenser and the reaction was started at 65° C. in nitrogen atmosphere.

The temperature of the solution was kept below 70° C., and 0.3 g. of azobisisobutylonitrile was added as the reaction was decreased.

In 45 minutes, the yellow color of tert.-butylhypochlorite disappeared. The contents were cooled off, and then, the excessive 3-chlorobutene-1, and the produced butanol and acetone were removed.

185 g. of t-butanol and little amount of acetone were extracted by water from the distilled product, and 526 g. of 3-chlorobutene-1 was recovered.

The residue was distilled at 40 mm. Hg, and 311 g. of 1,3-dichlorobutene-2, the boiling point 52 to 58° C., was obtained.

The yield of 1,3-dichlorobutene-2 based on t-butylhypochlorite was 80.4%, and the yielding rate of 1,3-dichlorobutene-2 against 3-chlorobutene-1 was 82.2%.

According to the analysis by means of gas chromatography, the constitution of the obtained 1,3-dichlorobutene-2 is 63% cis-isomer, and 37% trans-isomer being.

Pyrolysis of thus obtained 1,3-dichlorobutene-2 was carried out. During an hour 200 g. of 1,3-dichlorobutene-2 was fed into a 300 mm. long 18 mm. wide stainless steel tube heated at 450±20° C. under atmospheric pressure, and heat-cracking was carried out, and as a result 541 g. substantially pure chloroprene was obtained, and at the same time 116 g. 1,3-dichlorobutene-2 was recovered.

We claim:

1. A process for producing 1,3-dichlorobutene-2, which comprises reacting 3-chlorobutene-1 with an alkylhypochlorite selected from the group consisting of tertiary butylhypochlorite and tertiary amylhypochlorite, and separating the thus-produced 1,3-dichlorobutene-2.

2. A process for producing 1,3-dichlorobutene-2, which comprises reacting reformed 3-chlorobutene-1 with an alkylhypochlorite selected from the group consisting of tertiary butylhypochlorite and tertiary amylhypochlorite, and separating the thus-produced 1,3-dichlorobutene-2, said reformed 3-chlorobutene-1 being pretreated by distilling a monochloroolefin stock selected from 3-chlorobutene-1, 1-chlorobutene-2 and a mixture thereof in the presence of at least one metallic chloride selected from the group consisting of cuprous chloride, zinc chloride, stannous chloride and bismuth chloride, thereby said 3-chlorobutene-1 in the stock being reformed and said 1-chlorobutene-2 in the stock being isomerized to 3-chlorobutene-1.

3. A process for producing 1,3-dichlorobutene-2, which comprises reacting reformed 3-chlorobutene-1 with an alkylhypochlorite selected from the group consisting of tertiary butylhypochlorite and tertiary amylhypochlorite, and separating the thus-produced 1,3-dichlorobutene-2, said reformed 3-chlorobutene-1 being obtained by distilling a monochloroolefin stock selected from 3-chlorobutene-1, 1-chlorobutene-2 and a mixture thereof in the presence of at least one metallic chloride selected from the group consisting of cuprous chloride, zinc chloride, stannous chloride and bismuth chloride and at least one organic amine selected from the group consisting of α-, β- and γ-picoline, monoethanolamine, diethanolamine, triethanolamine, toluidene, primary-, secondary- and tertiary-butylamine, thereby said 3-chlorobutene-1 in the stock being reformed and said 1-chlorobutene-2 in the stock being isomerized to 3-chlorobutene-1.

4. A process for producing 1,3-dichloroolefin, which comprises reacting a monochloroolefin selected from the group consisting of 3-chloropropene and 3-chlorobutene-1 with an alkylhypochlorite selected from the group consisting of tertiary butylhypochlorite and tertiary amylhypochlorite in the presence of a free radical reaction initiator.

5. The process according to claim 4 wherein the reaction initiator is azobisisobutyronitrile.

6. The process according to claim 4 wherein the reaction initiator is benzoylperoxide.

7. The process according to claim 4 wherein the reaction initiator is ultraviolet ray.

References Cited by the Examiner

UNITED STATES PATENTS

| | | |
|---|---|---|
| 1,950,438 | 3/1934 | Carothers et al. ____ 260—652.5 |
| 2,176,055 | 10/1939 | Britton et al. _____ 260—654 X |
| 2,179,787 | 11/1939 | Harford _____ 260—654 |
| 2,242,084 | 5/1941 | Nicodemus et al. ____ 260—654 |
| 2,446,475 | 8/1948 | Hearne et al. _____ 260—654 |

OTHER REFERENCES

Walling et al., "Jour. Amer. Chem. Soc.," vol. 82 (1960), pp. 6108–15.

Hearne, "The Vortex" (Bull. Col. Am. Chem. Soc.), vol. IX, No. 8, pp. 412–421.

LEON ZITVER, *Primary Examiner.*

K. V. ROCKEY, *Assistant Examiner.*